(12) United States Patent
Kronawitter et al.

(10) Patent No.: US 8,499,923 B2
(45) Date of Patent: Aug. 6, 2013

(54) DEVICE AND METHOD FOR CHANNELING CONTAINERS

(75) Inventors: Michael Kronawitter, Beimerstetten (DE); Stefan Angele, Moosburg (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 20 days.

(21) Appl. No.: 13/369,753

(22) Filed: Feb. 9, 2012

(65) Prior Publication Data

US 2012/0222936 A1    Sep. 6, 2012

(30) Foreign Application Priority Data

Mar. 4, 2011   (EP) ..................................... 11157031

(51) Int. Cl.
*B65G 47/29*   (2006.01)

(52) U.S. Cl.
USPC ........ 198/617; 198/460.1; 198/415; 198/416; 198/419.3; 198/459.6

(58) Field of Classification Search
USPC ................ 198/415, 416, 419.3, 459.1, 459.6, 198/459.7, 460.1, 617
See application file for complete search history.

(56) References Cited

U.S. PATENT DOCUMENTS

| | | | | |
|---|---|---|---|---|
| 2,744,608 | A * | 5/1956 | Ardell et al. | 198/450 |
| 2,771,177 | A | 11/1956 | Cutter et al. | |
| 3,987,889 | A * | 10/1976 | Godoy | 198/429 |
| 4,147,249 | A * | 4/1979 | Tourres | 198/459.1 |
| 5,070,992 | A * | 12/1991 | Bonkowski | 198/419.1 |
| 5,161,664 | A * | 11/1992 | LeBras | 198/419.3 |
| 5,979,147 | A * | 11/1999 | Reuteler | 53/448 |
| 6,321,896 | B1 * | 11/2001 | Zuccheri et al. | 198/419.1 |
| 6,460,683 | B1 * | 10/2002 | Pfeiffer | 198/460.1 |
| 6,520,316 | B2 * | 2/2003 | De Guglielmo et al. | 198/419.3 |
| 6,527,102 | B2 * | 3/2003 | De Guglielmo et al. | 198/419.3 |
| 6,889,485 | B2 * | 5/2005 | Davaillon | 53/443 |
| 6,968,937 | B2 * | 11/2005 | Mader et al. | 198/419.1 |
| 6,978,877 | B2 * | 12/2005 | Spatafora et al. | 198/341.01 |
| 7,055,671 | B2 * | 6/2006 | De Guglielmo et al. | 198/419.2 |
| 7,124,558 | B2 * | 10/2006 | Weaver et al. | 53/539 |
| 7,806,250 | B2 * | 10/2010 | Ford | 198/470.1 |
| 8,074,788 | B2 * | 12/2011 | Tachibana | 198/781.05 |
| 8,235,200 | B2 * | 8/2012 | Fischbacher | 198/419.1 |
| 8,360,229 | B2 * | 1/2013 | Janning | 198/459.1 |

FOREIGN PATENT DOCUMENTS

| | | |
|---|---|---|
| DE | 10154203 A1 | 6/2002 |
| FR | 2350285 A1 | 12/1977 |
| FR | 2487308 A1 | 1/1982 |

OTHER PUBLICATIONS

EP Search Report for EP 11157031 dated Aug. 4, 2011.

* cited by examiner

*Primary Examiner* — Douglas Hess
(74) *Attorney, Agent, or Firm* — Brinks Hofer Gilson & Lione (57) ABSTRACT

A method for channeling upright containers, which are loosely queued in a row, into a transport device is performed by a rotatable separating device, which has the purpose of separating the loosely queued containers, and a stationary accumulating device for the containers downstream of the separating device. The accumulating device has a plurality of stoppers arranged in a row in the transport direction, which can be extended individually in the direction transverse to the transport direction and, in the extended state, define holding positions for the containers. The stoppers are extended one-by-one based on sensor results to sequentially fill the holding positions of the accumulating device starting from the holding position arranged farthest from the separating device.

7 Claims, 12 Drawing Sheets

DEVICE AND METHOD FOR CHANNELING CONTAINERS

RELATED APPLICATIONS

The present patent document claims the benefit of priority to European Patent Application No. EP 11157031.3, filed Mar. 4, 2011, and entitled "DEVICE AND METHOD FOR CHANNELING CONTAINERS" the entire contents of each of which are incorporated herein by reference.

FIELD AND BACKGROUND

The present invention relates to a device and to a method for channeling containers into a transport device.

In the prior art there are a number of different ways in which containers can be channeled into transport devices. Many of the known designs work with a separating device, which forms the upright containers into a row in the transport direction with a certain spacing between them, each container thus being made available individually for further transport. Examples of such separating devices include, for example, separating wheels.

DE 101 54 203 B4 proposes a transfer device downstream of the separating device. This transfer device is designed as an endless belt with drivers. Such transfer device, however, is suitable only for transferring containers to a continuous transport device, and because of the constant speed of the endless belt, problems can occur when the distances between the containers provided by the separating device are irregular.

BRIEF SUMMARY

It is an object of the present invention to provide a method for channeling containers, by means of which containers of different sizes can be transferred easily and at different speeds to an intermittently operating transport device.

According to an aspect of the invention, the method for channeling upright containers, which are loosely queued in a row, into a transport device, comprises:

a) providing a rotatable separating device, a stationary accumulating device arranged downstream of the separating device, and a conveyor belt extending at least from an area in front of the separating device to the accumulating device, wherein the accumulating device comprises a plurality of holding positions defined by stoppers arranged in a row in a transport direction, the stoppers individually extendable in a direction transverse to the transport direction to hold the containers, and wherein the accumulating device further comprises a plurality of sensors each of the sensors arranged in an area of one of the holding positions or between two of the holding positions;

b) separating the loosely queued containers in the transport direction by means of the rotatable separating device;

c) moving the separated upright containers in the transport direction by means of the conveyor belt on which the separated containers stand; and d) sequentially filling the holding positions of the accumulating device with the separated containers, starting from the holding position arranged farthest from the separating device, wherein the step of sequentially filling the holding positions comprises the steps of d1) sensing by a predetermined one of the sensors a position of a predetermined one of the separated containers, and individually extending on the basis of the sensing result a predetermined one of the stoppers; and d2) repeating step d1) until all desired holding positions have been sequentially filled with the desired number of containers.

In this way, containers of various sizes and traveling at various speeds can be separated and accumulated temporarily in a reliable and trouble-free manner, before they are transferred to an intermittently operating transport device.

Because of the sensor-triggered sequential extension of the stoppers, the accumulating device is filled reliably with containers even if the containers are arriving nonuniformly.

The respective sensor preferably supplies signals to a control unit in each case to actuate the extension of a stopper. This can be, for example, the very next downstream stopper or the stopper after that, depending on the size of the containers. It is also possible that the triggered stopper is arranged upstream of the respective sensor.

Even if all of the stoppers can be actuated individually, it is advantageous for all of the extended stoppers to be retracted simultaneously when all desired holding positions are filled. Thus, the containers are released rapidly for transfer to the intermittent transport device.

BRIEF DESCRIPTION OF THE DRAWINGS

Additional features and advantages of the present invention can be derived from the following description, which is based on the drawings.

DETAILED DESCRIPTION OF SPECIFIC EMBODIMENTS

Figure 1:
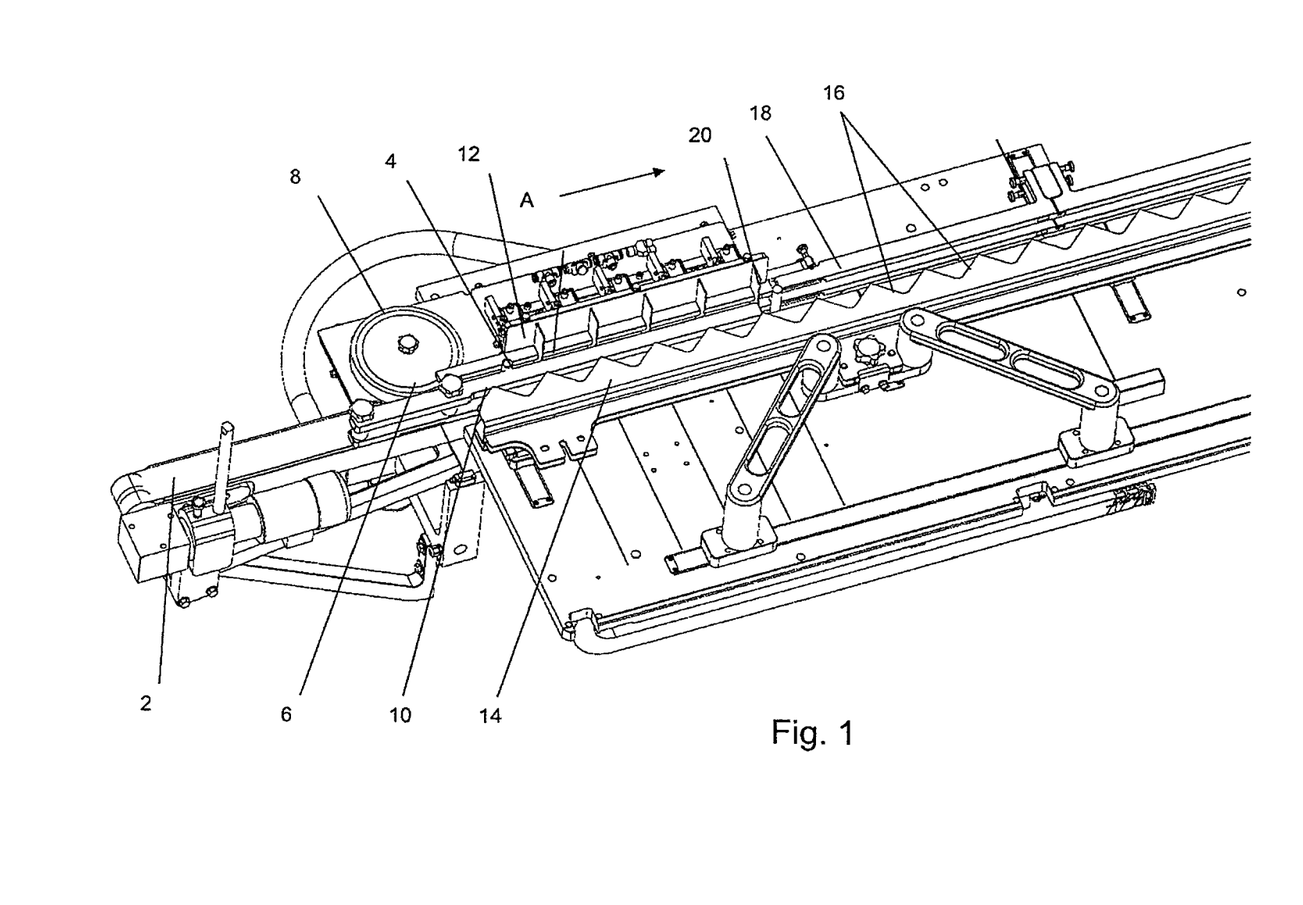
FIG. 1 is a perspective schematic diagram of one embodiment of a device for channeling containers into a transport device.

FIG. 1 shows an embodiment of a device for channeling containers into a transport device. The device comprises a conveyor belt 2, on which the containers 4 stand and are conveyed forward. The conveyor belt 2 moves at a constant speed in the transport direction (arrow A) of the containers 4. The containers 4 can be upright cans or small bottles and can be made of many different materials. When the containers 4 travel through the device, they are usually empty.

The device also comprises a rotatable separating device, which, in the embodiment shown here, is designed as an intermittently driven separating wheel 6. The rotational speed of the separating device during a rotational cycle is preferably slower than the speed of the conveyor belt 2, but alternatively it could also be faster. Instead of the embodiment shown, the rotatable separating device could also be designed in the form of two opposing separating wheels driven in opposite directions, or in the form of a driven separating belt. Preferably, the rotatable separating device is designed in the form of two driven opposing separating belts.

In the embodiment shown here, the separating wheel comprises a lateral surface 8, coated with plastic or rubber, which comes in contact with the loosely queued upright containers 4 being delivered by the conveyor belt 2, so that the friction between the lateral surface 8 and the containers 4 slows the containers down in the transport direction A. Opposite the separating wheel 6 is a linear guide rail 10, which ensures that the containers remain on the conveyor belt 2 and that a counter pressure to the separating wheel 6 is created.

Downstream of the separating device 6, the device comprises a stationary accumulating device 12 for the containers 4. The conveyor belt 2 extends at least from an area in front of the separating device 6 to the accumulating device 12. The guide rail 10 also extends preferably from the separating device 6 to the end of the accumulating device 12.

The accumulating device 12 serves to hold temporarily the containers 4 which have been separated by the separating device 6 and to keep them at a defined distance from each other, so that they can then be transferred to an intermittently operating transport device 14.

The transport device 14 is designed here as a rake conveyor, which can be shifted back and forth both in the transport direction A of the containers 4 and also transversely to the transport direction of the containers 4. The containers 4 are held in the receiving sections 16 of the rake conveyor, which open out toward the accumulating device 12 and, in the preferred exemplary embodiment shown here, are substantially triangular. This makes it possible to adapt the system variably to containers 4 of different sizes. Opposite the receiving sections 16, a support surface 18 is set up in the area of the accumulating device 12. The support surface 18 is preferably smooth so that there is the least possible friction between it and the containers 4, and it serves to support the containers 4 as they are being carried forward by the transport device 14. In the example shown here, the support surface 18 extends over the entire length of the rake conveyor.

The stationary accumulating device 12 for the containers 4 comprises a plurality of stoppers 20, arranged in a row in the transport direction, which can be actuated individually. Each stopper 20 can thus be extended transversely to the transport direction, as a result of which a plurality of holding positions arranged sequentially in the transport direction is defined. A container 4 is assigned to each holding position, but it is also possible for a single large container 4 to occupy two holding positions, as will be explained further below.

The stoppers 20 can be moved by suitable pneumatic elements, for example. A person skilled in the art will be able to conceive of other types of drives.

The accumulating device 12 also comprises a plurality of sensors 22, which are arranged in the area of the holding positions or between the holding positions. When a certain sensor 22 detects a passing container 4 (e.g., its ascending or descending flank), this sensor 22 will supply corresponding signals to a control unit (not shown), which, in response, gives the command to extend a predetermined stopper 20. Because of the time delay, the control unit is usually programmed so that it always extends the next downstream stopper 20 or the one after that.

Figure 2:
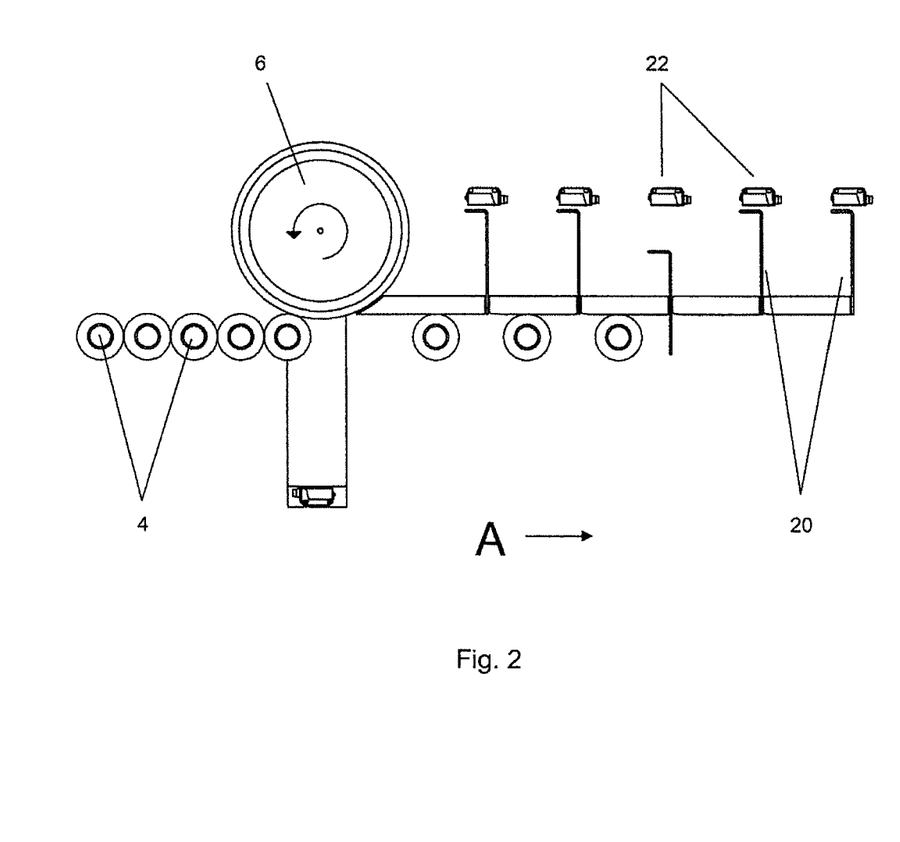
FIGS. 2-4 are schematic diagrams showing the filling of the accumulating device with small containers in groups of three.
Figure 3:
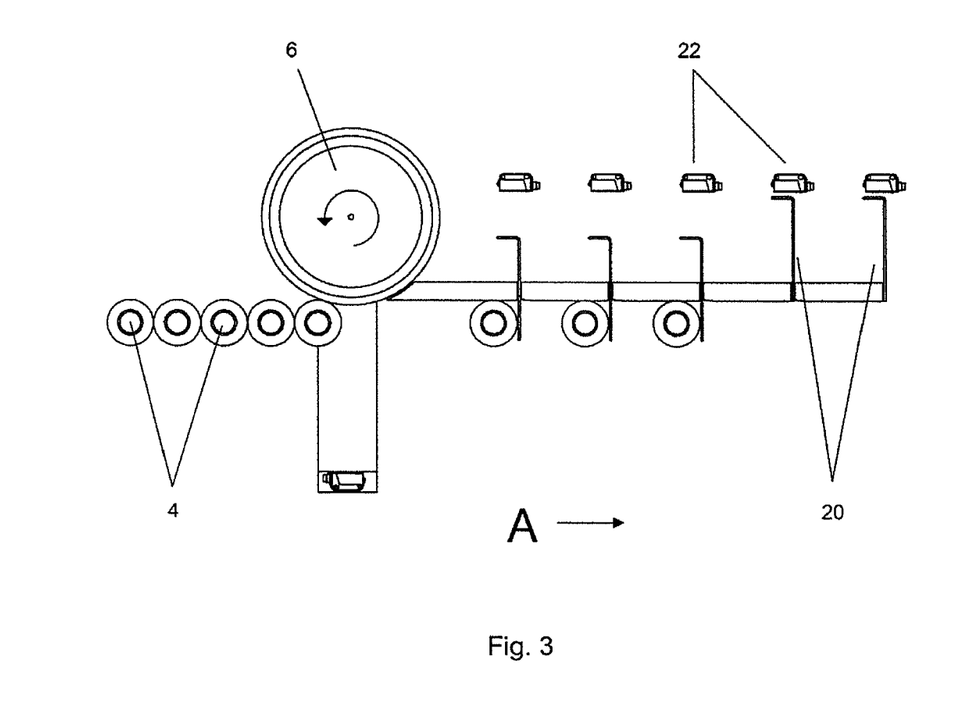
Figure 4:
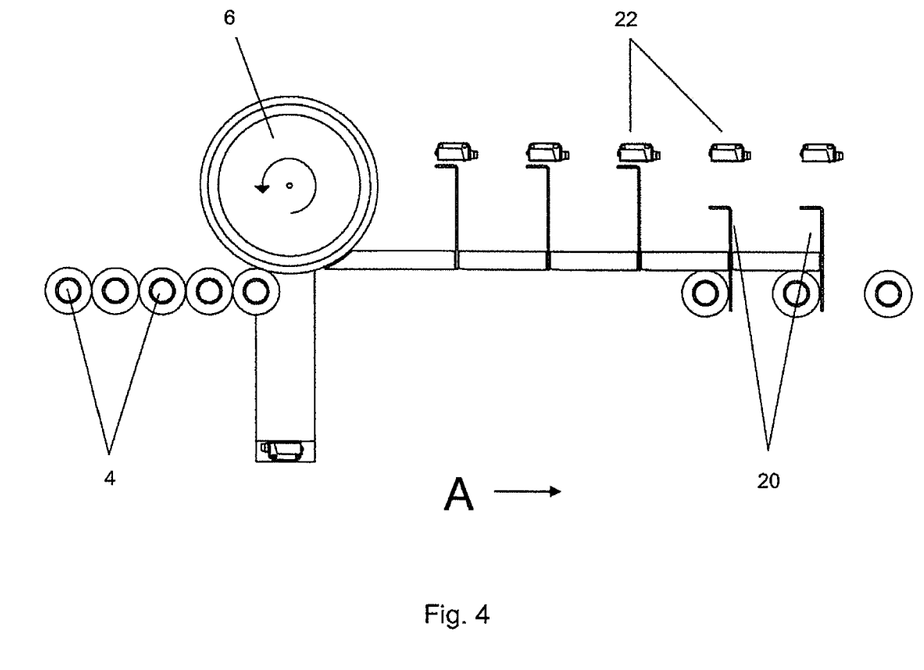
Figure 5:
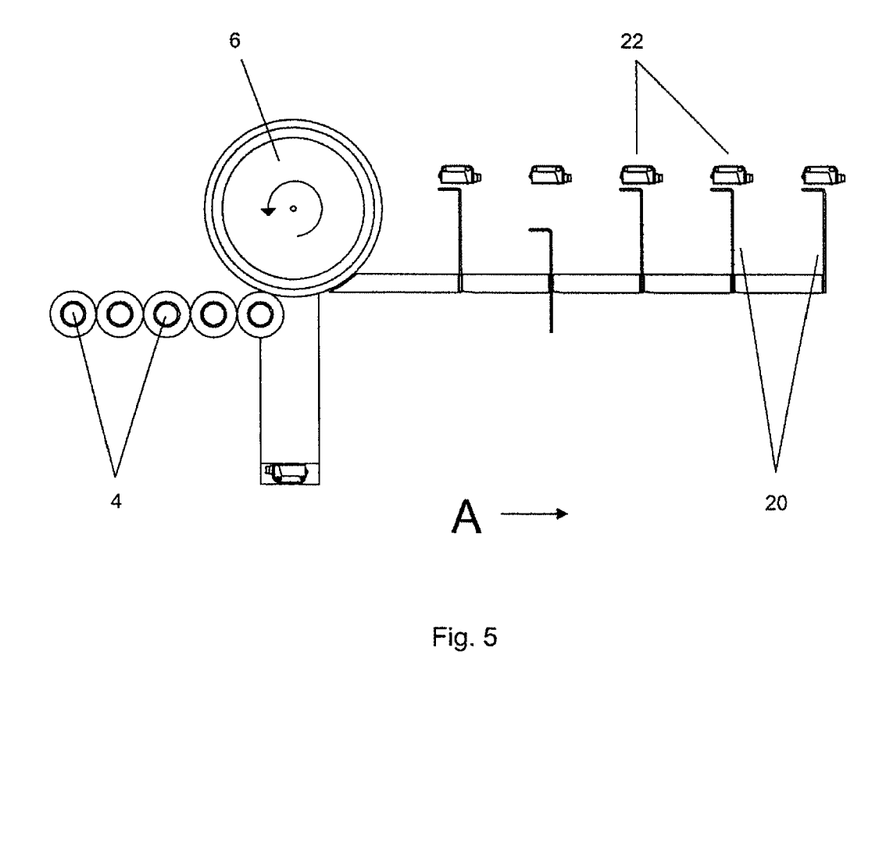
FIGS. 5-8 are schematic diagrams showing the filling of the accumulating device with small containers in groups of two.
Figure 6:
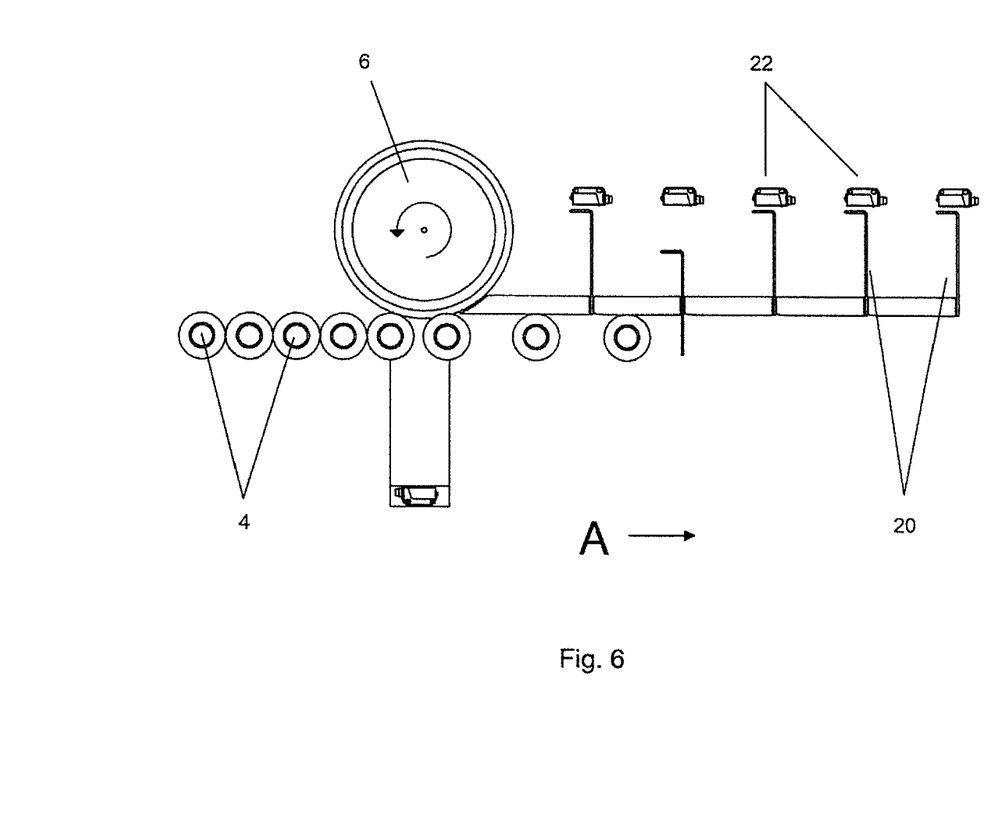
Figure 7:
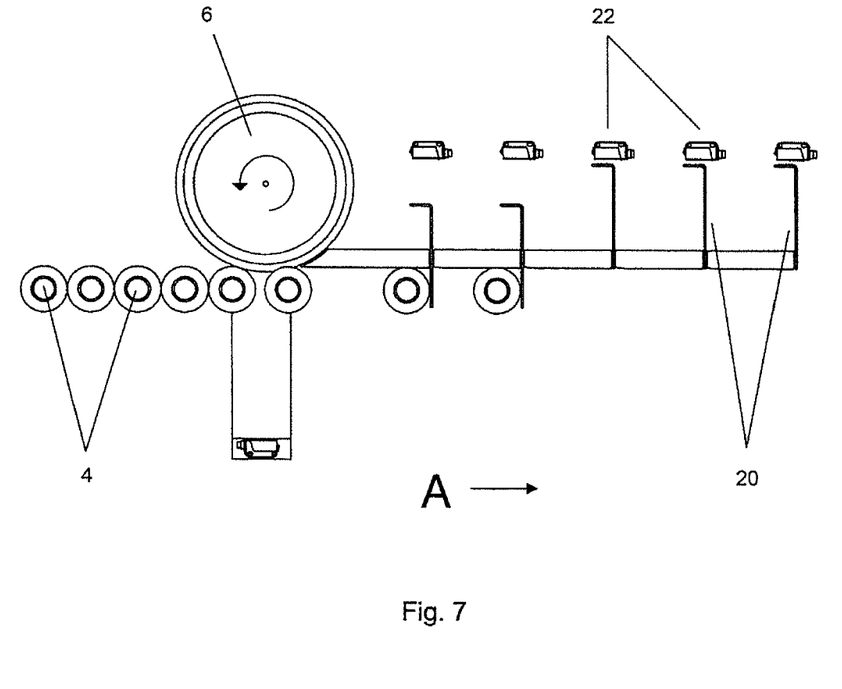
Figure 8:
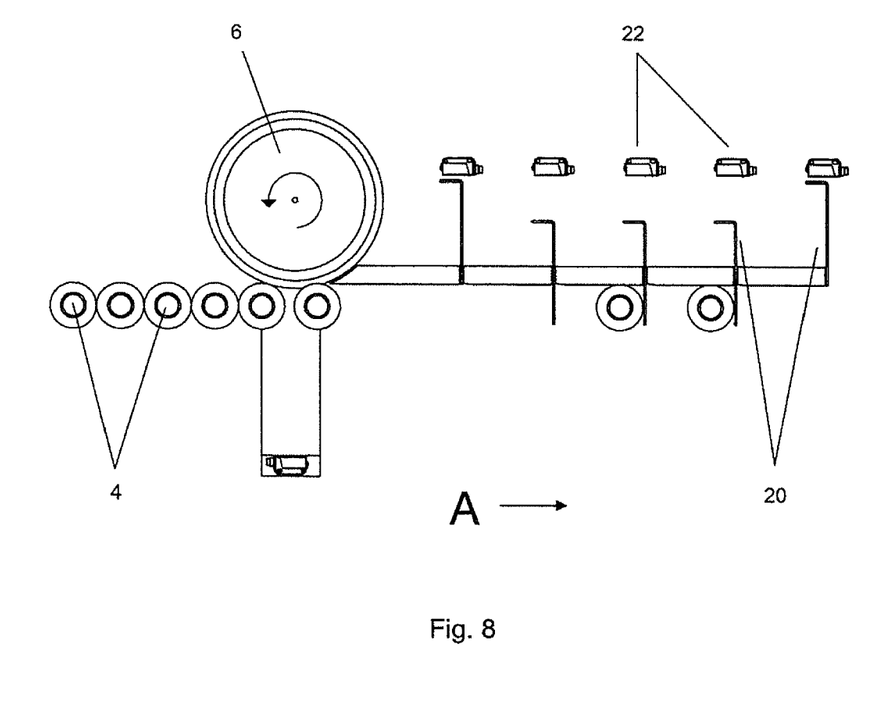
Figure 9:
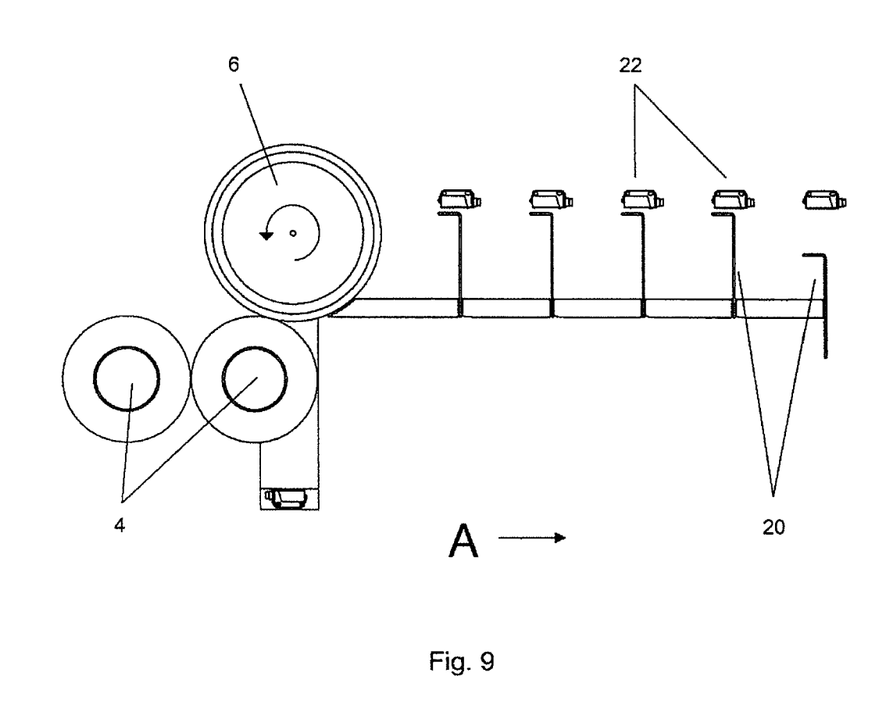
FIGS. 9-12 are schematic diagrams showing the filling of the accumulating device with large containers in groups of three.
Figure 10:
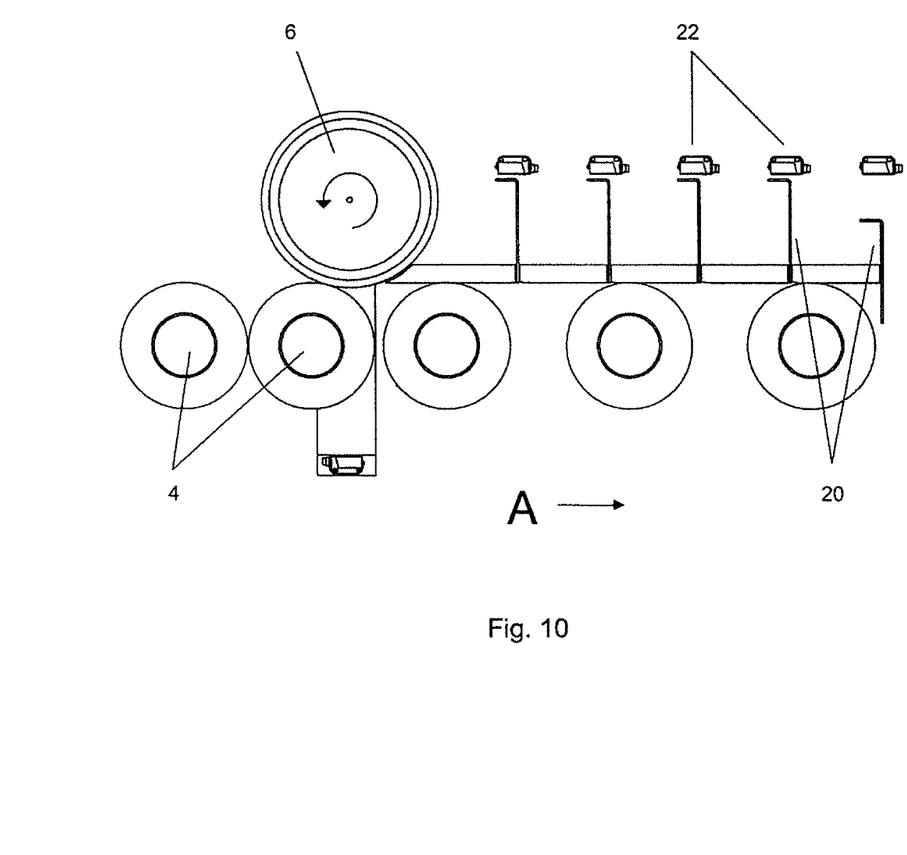
Figure 11:
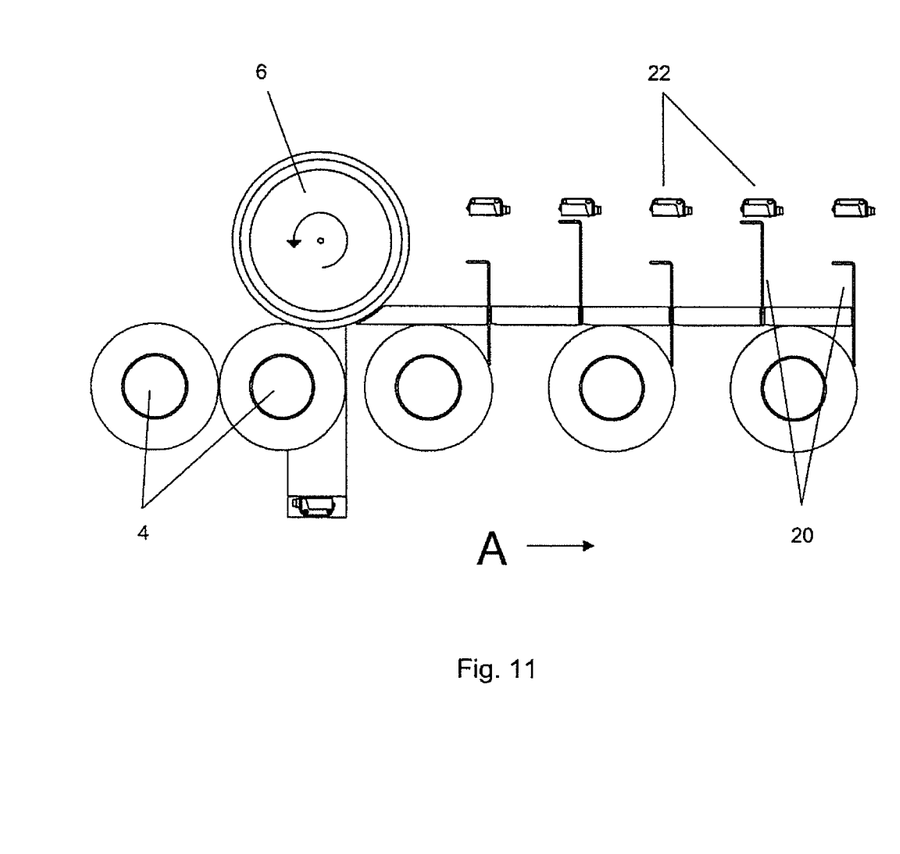

We thus obtain the sequence diagrams describing the filling method shown in FIGS. 2-4. First, the loosely queued containers 4 are transported on a conveyor belt 2 to the separating device 6. Because the rotational speed of the separating device 6 is slower than the speed of the conveyor belt 2, a container 4 coming in contact with the separating device 6 is slowed down in the transport direction A by the separating device 6 and thus separated from its neighbors. The container 4 remains on the conveyor belt 2, however, and is moved forward again by the conveyor belt 2 downstream of the separating wheel 6.

After that, each separated container 4 travels into the accumulating device 12, in which the individual holding positions are filled up sequentially with containers 4 starting from the one of the desired holding positions arranged farthest from the separating device 6. In the embodiment shown in FIG. 2, the accumulating device 12 comprises five stoppers 20; of these, only the third stopper 20 is extended at the time the accumulating device 12 begins to fill up with containers. As soon as the passage of the second container 4 through the fourth or fifth holding position from the right has been detected by the corresponding sensor 22, the adjacent downstream stopper 20, i.e., in the present case the second stopper 20 from the left, extends, whereupon the associated holding position fills up with the next container 4, etc.

Figure 12:
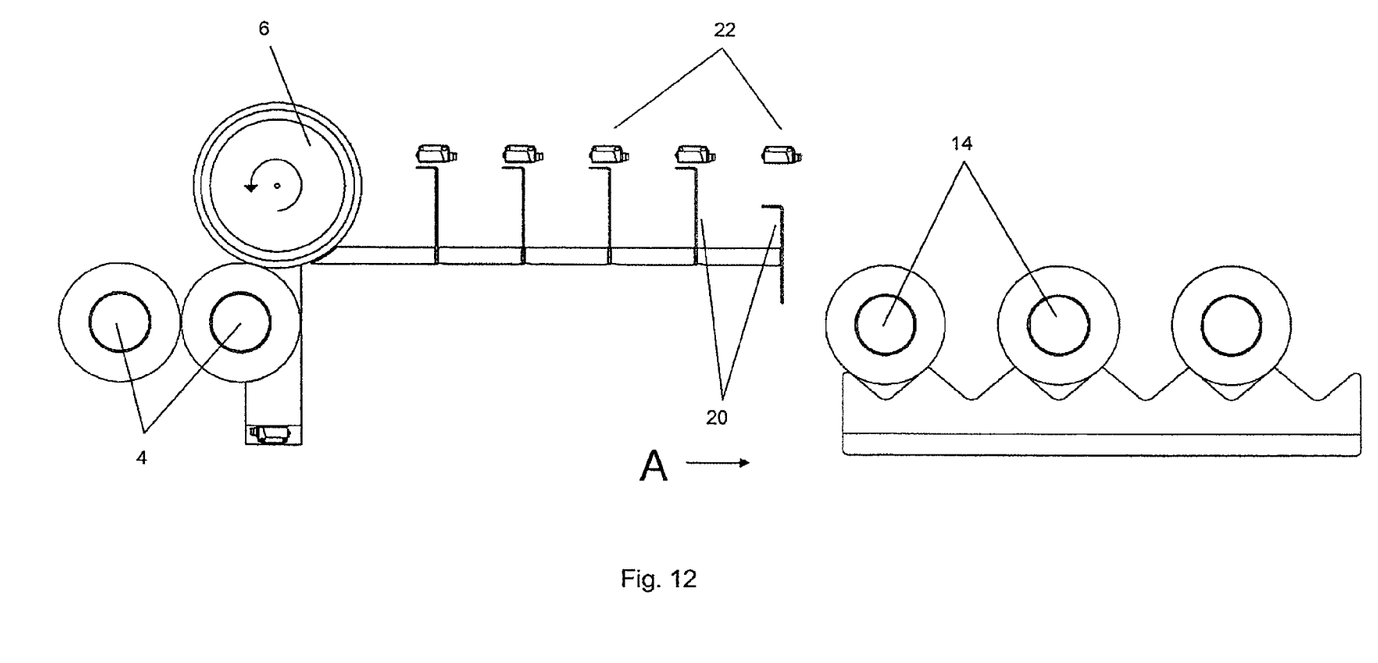

FIG. 3 shows that the accumulating device 12 has been filled with three containers 4 in the three holding positions on the left. After that, the three held containers 4 are conveyed forward, as shown in FIG. 4, wherein the three previously extended stoppers 20 must be retracted simultaneously to allow the containers 4 to move onward. The containers 4 are carried forward preferably by means of the intermittent transport device 14, which is shown only in FIGS. 1 and 12.

FIG. 4 shows the result of the intermittent shifting step. The containers 4 have been moved forward by three positions, and the filling of the three holding positions of the accumulating device 12 on the left can begin again from the beginning. In this way, it is possible to transfer containers 4 arranged with a defined distance between them intermittently to the following processing stations.

FIGS. 5-8 describe a similar process of filling the accumulating device 12, wherein only two containers 4 are introduced simultaneously into the accumulating device 12, before they are moved onward by the intermittent transport device 14.

FIGS. 9-12 show schematic diagrams of the channeling of containers 4 of larger diameter. Every second stopper 20 remains in its retracted position.

In this way, it is possible with suitable actuation to channel containers 4 of different sizes and shapes without the need for mechanical format adjustments or the need to replace format components.

The sensors 22 and stoppers 20 can also be connected to the control unit in some other suitable way.

To adapt the format, furthermore, the accumulating device 12 can also be shifted as a whole transversely to the transport direction A of the containers 4 before operation.

According to the above, the respective sensor 22 triggers the extension of a stopper 20 arranged downstream of the respective sensor 22 by detecting a moving container 4. It is also possible that the respective sensor 22 triggers the extension of a stopper 20 arranged upstream of the respective sensor 22 by detecting a container 4 moving close to its holding position.

Thus, depending on the size and speed of the containers 4 and the desired distance between them, the control unit can include different control options. In other words, each sensor signal can be coupled to the activation of any stopper according to the requirements and the boundary conditions of the respective application.

The invention claimed is:

1. A method for channeling upright containers, which are loosely queued in a row, into a transport device, the method comprising:
   a) providing a rotatable separating device, a stationary accumulating device arranged downstream of the separating device, and a conveyor belt extending at least from an area in front of the separating device to the accumulating device, wherein the accumulating device comprises a plurality of holding positions defined by stoppers arranged in a row in a transport direction, the stoppers individually extendable in a direction transverse to the transport direction to hold the containers, and wherein the accumulating device further comprises a plurality of sensors each of the sensors arranged in an area of one of the holding positions or between two of the holding positions;

b) separating the loosely queued containers in the transport direction by means of the rotatable separating device;

c) moving the separated upright containers in the transport direction by means of the conveyor belt on which the separated containers stand; and d) sequentially filling the holding positions of the accumulating device with the separated containers, starting from the one of the desired holding positions arranged farthest from the separating device, wherein the step of sequentially filling the holding positions comprises the steps of;

d1) sensing by a predetermined one of the sensors a position of a predetermined one of the separated containers, and individually extending on the basis of the sensing result a predetermined one of the stoppers; and d2) repeating step d1) until all desired holding positions have been sequentially filled with the desired number of containers.

2. The method of claim 1 wherein in step d1) the predetermined one of the stoppers, which is extended on the basis of the sensing result of the predetermined one of the sensors, is arranged downstream of the predetermined one of the sensors.

3. The method of claim 1 wherein in step d1) the predetermined one of the stoppers, which is extended on the basis of the sensing result of the predetermined one of the sensors, is arranged upstream of the predetermined one of the sensors.

4. The method of claim 1 further comprising the step of retracting all of the extended stoppers simultaneously when all desired holding positions are filled.

5. The method of claim 1 wherein the separating device comprises two opposing separating belts.

6. The method of claim 1 wherein the separating device is designed as an intermittently driven separating wheel.

7. The method of claim 6 wherein a lateral surface of the separating wheel is a coated with flexible plastic or rubber.

* * * * *